No. 865,134. PATENTED SEPT. 3, 1907.
H. L. STOUP.
RUBBER TIRE SETTER.
APPLICATION FILED MAR. 9, 1907.

Witnesses
Thos. O'Donnell.
James P. Barry.

Inventor
Henry L. Stoup
By Whittemore Hulbert Whittemore
attys.

UNITED STATES PATENT OFFICE.

HENRY L. STOUP, OF YPSILANTI, MICHIGAN.

RUBBER-TIRE SETTER.

No. 865,134.  Specification of Letters Patent.  Patented Sept. 3, 1907.

Application filed March 9, 1907. Serial No. 361,585.

*To all whom it may concern:*

Be it known that I, HENRY L. STOUP, a citizen of the United States of America, residing at Ypsilanti, in the county of Washtenaw and State of Michigan, have invented certain new and useful Improvements in Rubber-Tire Setters, of which the following is a specification, reference being had therein to the accompanying drawings.

In the present state of the art, rubber tires are usually secured to the wheel fellies, or rims, by providing one or more metallic securing wires, or bands, which pass longitudinally through the rubber tire and, when secured together at their ends, clamp the tire firmly to the rim. To be effective, this form of securing device must be placed under considerable tension, and it is the object of the present invention to provide a machine for accomplishing this purpose easily and expeditiously.

To this end, the invention consists in the novel construction as hereinafter set forth.

Figure 1:
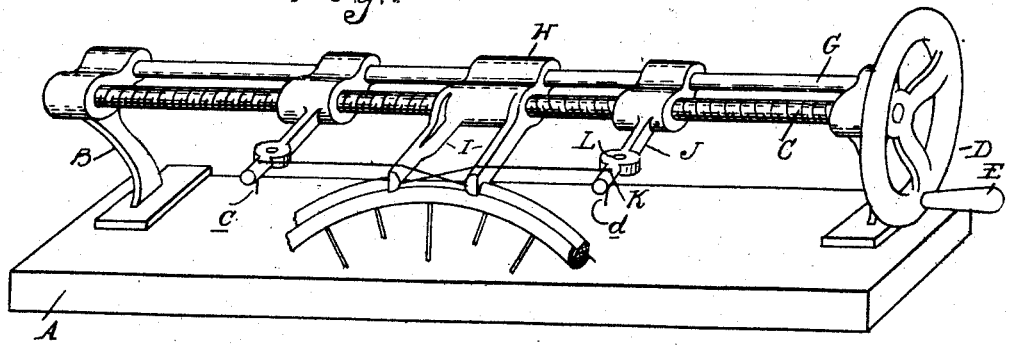
Figure 2:
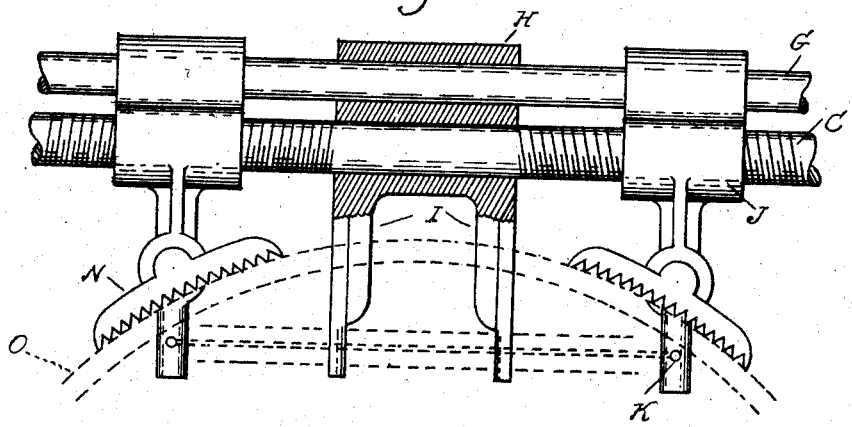
Figure 3:
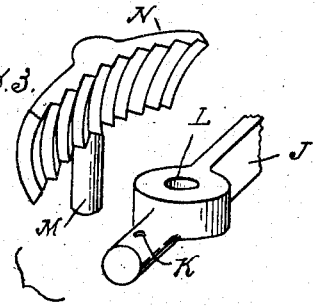
Figure 4:
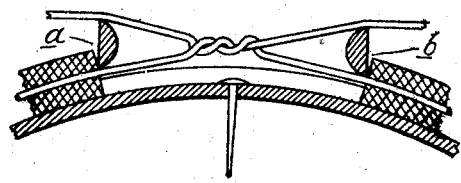

In the drawings, Figure 1 is a perspective view of the machine as in operation; Fig. 2 is an enlarged sectional plan view of a portion of the machine, illustrating, by dotted lines, the wheel in two different positions of engagement; Fig. 3 is a perspective view of the tire closing jaw and the arm to which it is detachably secured; Fig. 4 is a vertical section illustrating the means for connecting the ends of the clamping band after being placed under tension.

The wheel fellies, or rims, to which tires of the type above described are secured, are usually grooved so that when the securing wire, or band, is properly tensioned, the tire will be prevented from lateral disengagement from the rim. The metallic securing device is usually a wire of round cross section, and the rubber tire is a tube sleeved upon this wire, and being of a length to encircle the rim of the wheel. Thus, to secure the tire, it is necessary to place it in the groove of the rim and tension the metallic wire after which the ends of the wire are twisted into engagement between the ends of the rubber tire, the latter being first forced back to provide room for the twisting tool.

My improved machine comprises broadly an arm, or rest, against which the rim of the wheel is placed, the said member also forming abutments for the ends of the rubber tire to hold them apart during the tensioning operation. The machine is further provided with clamping jaws on opposite sides of this rest arm with which the ends of the metallic wire, or band, may be engaged, and, further, means for moving said jaws apart to tension the wire. The central arm is preferably bifurcated to provide a space between the separated ends of the rubber tire, in which the twisting of the wires may be effected, and said wires cross each other diagonally in the space between the furcations of said member.

In detail, A is a suitable base, to which is secured a pair of brackets, or bearings, B for supporting a rotary shaft C. This shaft is provided at one end with a hand-wheel D and a suitable handle E, by which it may be revolved. The shaft is also threaded, and the threaded portions upon opposite sides of the center are respectively right and left.

G is a guide arm arranged parallel to the shaft A, and preferably supported at its opposite ends in the same brackets, or bearings, B which support the shaft.

H is an arm, which is sleeved upon the shaft C and guide rod G, and is provided with a forwardly projecting furcation portion I.

J are jaws, which are threaded for engagement respectively with the right and left threaded portions of the shaft C, these jaws being also sleeved upon the guide rod G for longitudinal adjustment thereon.

The furcations of the arm H are separated a sufficient distance to provide space for suitably twisting the securing wires therebetween, and, as illustrated in Fig. 1, these securing wires are drawn under one of the furcations and over the other. This will cause the wires to cross each other diagonally. The ends of the wires are engaged with the jaws J, which latter are preferably apertured at K near their outer ends for hooking in the end of the wire. Thus, to secure the tire, it is only necessary to place the same about the grooved rim of the wheel abutting the two ends, as indicated at $a$ and $b$, against the furcations I of the arm K, and then to attach the ends $c$ and $d$ of the securing wire respectively to the arms J. When thus arranged, the operator revolves the hand-wheel D, moving the jaws J outward from each other, and places whatever tension is required upon the wire. This being accomplished, the operator engages a suitable tool with the crossed wires between the furcations I of the arm H, twisting the wires to form an interlocking connection, and then clips off the opposite ends; that is, the portions extending from the twist to the jaws J.

The construction and operation, as above described, is all that is necessary for the securing of the tire, but it is obvious that, when the securing is completed, the ends of the rubber still remain separated. It is therefore necessary to draw the ends of the rubber tire together, and this operation I also preferably perform with the same machine by an attachment constructed as follows:

The arms J are provided near their outer ends with vertically extending sockets L adapted to receive the shanks M of the tire engaging jaws N. These jaws are preferably of segmental form being provided with notched, or serrated, faces for engaging with the face of the tire. When placed in position the shank M forms a swivel connection between the jaws N and the arms, so that if a wheel with a tire attached thereto is placed in a horizontal position, as indicated in Fig. 2, by the dotted lines O, it may be pressed against the jaws N, the teeth of which will engage with the tire. The operator then turns the hand-wheel D in the reverse direction from that in which it is rotated to tension the wire; this moving the jaws J towards each other, and drawing the rubber tire along the securing wire, until its ends are caused to abut.

It will be understood from the description above given that I am enabled to accomplish by this simple construction of mechanism the double operation of attaching and tensioning the tire and of drawing the separated ends of the tire together after securing.

What I claim as my invention is:

1. A machine of the character described, comprising a shaft having right and left threaded portions, a guide parallel to said shaft, wire-engaging members respectively engaging said right and left threaded portions of said shaft, and longitudinally slidably engaging said guide, and a bifurcated arm intermediate said wire-engaging members and sleeved upon said shaft and guide.

2. A machine of the character described, comprising a shaft having a right and left threaded portion, a parallel guide shaft, wire-engaging arms respectively engaging the right and left threaded portions of said shaft, and longitudinally slidably engaging said guide, tire-brake shoes detachably engaging sockets in said wire-engaging members and swiveled therein, and a bifurcated arm intermediate said wire-engaging members sleeved upon said shaft and guide.

In testimony whereof I affix my signature in presence of two witnesses.

HENRY L. STOUP.

Witnesses:
AMELIA WILLIAMS,
NELLIE KINSELLA.